United States Patent [19]

Tamura

[11] Patent Number: 4,748,469
[45] Date of Patent: May 31, 1988

[54] DISTANCE MEASURING DEVICE FOR CAMERA

[75] Inventor: Shuichi Tamura, Kanagawa, Japan

[73] Assignee: Canon Kabushiki Kaisha, Japan

[21] Appl. No.: 102,828

[22] Filed: Sep. 23, 1987

Related U.S. Application Data

[63] Continuation of Ser. No. 16,996, Feb. 19, 1987, abandoned, which is continuation of Ser. No. 730,326 May 3, 1985, abandoned.

[30] Foreign Application Priority Data

May 7, 1984 [JP] Japan ................................. 59-90323
Apr. 24, 1985 [JP] Japan ................................. 60-87821

[51] Int. Cl.$^4$ .......................... G03B 3/00; G01C 3/08
[52] U.S. Cl. ....................................... 354/403; 356/1; 250/201; 250/552; 250/578
[58] Field of Search ........................ 354/403; 356/1, 4; 250/201 AF, 216, 205, 578, 552, 553, 349, 353

[56] References Cited

U.S. PATENT DOCUMENTS

| | | | |
|---|---|---|---|
| 3,629,589 | 12/1971 | Gleixner | 250/205 |
| 4,346,988 | 8/1982 | Kimuro et al. | 356/1 |
| 4,371,261 | 2/1983 | Tsuji | 354/403 X |
| 4,470,681 | 9/1984 | Johnson | 354/403 |
| 4,575,211 | 3/1986 | Matsumura et al. | 354/403 |

Primary Examiner—M. B. Perkey
Attorney, Agent, or Firm—Toren, McGeady & Associates

[57] ABSTRACT

The disclosed distance measuring device for a camera capable of measuring the distances of a plurality of objects within a target area comprises center-weighting means for treating the distance information of the object whose image lies near or at the center of the area of the picture frame with a heavier emphasis than those of the other objects, whereby an optimum focusing adjustment is allowed to be formed automatically.

46 Claims, 5 Drawing Sheets

DISTANCE MEASURING DEVICE FOR CAMERA

This is a continuation of application Ser. No. 016,996, filed Feb. 19, 1987, now abandoned, which in turn is a continuation of application Ser. No. 730,326, filed May 3, 1985, now abandoned.

BACKGROUND OF THE INVENTION

1. Field of the Invention

This invention relates to improvements in the distance measuring device for a camera capable of measuring the distances of a plurality of objects within a target area as defined by a picture frame of the camera.

2. Description of the Prior Art

In conventional cameras, to automatically detect the in-focus condition, the so-called range finder for producing information representing the distance from the camera to an object to be photographed is responsive to the object only when its image lies near or at the central area of the picture frame of the camera. For a composition in which the image of a subject of principal photographic interest is put in the margin of the picture frame, the photographer first needs to preliminarily align the camera so that the subject image is in the range finder mark located at the center of the view finder to measure the distance of the subject, and then, while holding that measured distance information, to change the camera alignment so that the subject image reaches a desired location in the margin of the view finder before a camera release is actuated, in other words, to pre-focusing.

For the beginner, however, this pre-focusing technique is difficult to apprehend. Also, since the performance of the automatic focusing devices has been greatly improved today, most of the out-of-focus photographs are taken when pre-focusing was forgotten or not properly performed.

So, the present invention proposes an automatic in-focus detecting device having two or more optical paths through which light is projected to a target area, while the reflections of the projected light are processed to measure the distances of two or more objects in the target area. The necessity of the aforesaid prefocusing function is removed, in U.S. patent application Ser. No. 636,590 filed Aug. 1, 1984 (corresponding to Japanese Patent Application No. SHO 58-145068.

What is essential to the invention of the above-identified U.S. patent application, however, is that the distances of the plurality of objects measured at a time are averaged and it is to this mean value that the photographic lens is to be focused. Since the object which the photographer intends to photograph with principal interest is treated with an emphasis equal to the other objects surrounding that object, there is a drawback that though the image of at least one of the objects in the same picture frame is acceptably sharp, the image of the object of principal photographic interest cannot always be of a satisfactorily sharp focus.

An object of the present invention is to eliminate the above-described drawback of the prior known device and to provide a distance measuring device for a camera having a plurality of optical paths through which light is projected to a target area as defined by the field of view of a finder of the camera with center-weighting means for putting greater emphasis on information representing the distance of one of the objects in the respective optical paths whose image lies near or at the central portion of the area of the picture frame of the camera rather than on information representing the distances of the other objects.

Other objects of the invention will become apparent from embodiments shown below.

SUMMARY OF THE INVENTION

A distance measuring device for a camera capable of measuring the distances of a plurality of points in the area of a picture frame by projecting light to the points and receiving the reflection signals thereof, comprising signal emitting means for projecting distance measuring signals to the plurality of points in the area of the picture frame; signal receiving means for receiving the reflected signals of the distance measuring signals projected from the light emitting means, the signal receiving means forming proper measured distance information on the basis of the measured distance information of the plurality of the points in the aforesaid area of the picture frame obtained from the reflected signals; and center-weighting means for causing the light receiving means to emphasize the neighborhood of the central portion of the area of the picture frame rather than the other part of the area of the picture frame concerning the formation of the measured distance information of the signal receiving means.

This invention thereby gives the advantage that when the object of principal interest lies at the center of the target area, its image can be brought into as sharp a focus as in the conventional automatic in-focus detecting device formed by only one projection light path, and conversely when the object of principal interest lies in the marginal portion of the picture frame, the image sharpness of this object falls within an acceptable range without having to carry out pre-focusing. Thus, great advances in performance and manageability have been achieved.

DETAILED DESCRIPTION OF THE PREFERRED EMBODIMENTS

The present invention is next described in conjunction with embodiments thereof by reference to the drawings.

Figure 1:
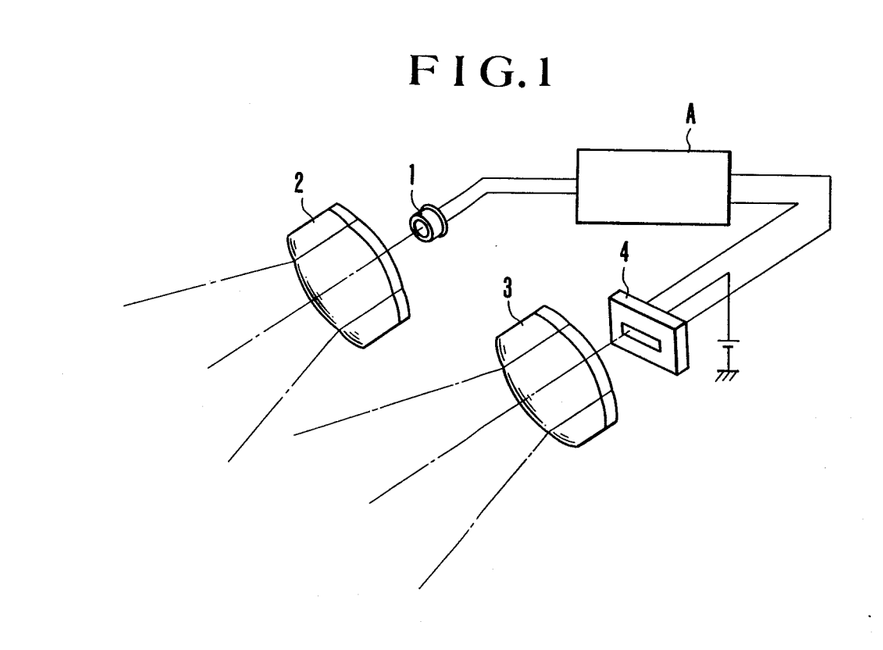
FIG. 1 is a schematic perspective view of an embodiment of a distance measuring device for a camera in accordance with the present invention.

In FIG. 1 there is shown the distance measuring device for a camera of the invention, where an infrared ray emitting diode 1 is a light source behind a projection lens 2 which serves as an optical system for projecting signal light from the infrared ray emitting diode 1 to a target area. This optical system comprises three lenses of different optical axes arranged in laterally contacting relation. The signal light from the infrared ray emitting diode 1 is projected by the lens 2 in splitting relation to three points in the target area, which correspond to the central and marginal points in the area of the picture frame of the camera. A collection lens 3, as a light receiving optical system, directs the reflections of the aforesaid signal light from three objects in the respective optical paths of projected light to a light receiving element 4. Similar to the projection lens 2, this collection lens 3 is constructed with three elements of different optical axes arranged in laterally contacting relation so that all the reflections enter the light receiving element 4.

It should be noted here that the three optical axes of the projection lens 2 make the same angles with one another as the three axes of the collection lens 3 make with one another, as viewed three-dimensionally. In other words, parallel displacing of the projection lens 2 to a line passing through the lenses 2 and 3 gives a coincidence of its three optical axes with the corresponding optical axes of the collection lens 3.

In this embodiment, the light receiving element 4 is in the form of a semiconductor position sensitive device (PSD). As the object distance increases or decreases, the point at which the light transmitted by reflection from the target area through one of the optical paths of the collection lens 3 is incident on the light receiving surface moves from one end of the length thereof to the other with variation of the output thereof. In the case of the semiconductor position sensitive device, since it has two outputs at the ends of the length, the ratio of the values of these outputs varies as a function of the relative position of the incident light on the light receiving surface thereof. The detection of this output ratio leads to determination of the object distance. For this purpose, a signal processing circuit, of which a practical example is disclosed in Japanese Laid-Open Patent Application No. SHO 57-44809, has a circuit A which may be connected to the output of the light receiving element 4.

One of the features of the invention is that it is through the three optical paths that the projected light is transmitted by reflection from the target area to the light receiving element 4. For the three points of intersection of the projection and return optical paths which are all equidistant from the camera, the points of incidence of the three reflections on the light receiving element 4 coincide with one another. Therefore, the output of the light receiving element 4 represents the only object distance. If three objects within a target area lie at different distances from one another, as the points of incidence of the reflections on the light receiving element 4 separate from one another, its output represents the average of the values of the three object distances.

Now, assuming that only one of the aforesaid three points within the target area catches a subject of principal photographic interest, while the other two points go to the background of the subject, (this accounts for most of the photographic situations which have actually been encountered), then what is found is that, according to the prior art, that there is a large discrepancy from the true distance of the subject, influenced by such a background. For this reason, the use of such a prior known distance measuring device in the automatic in-focus detecting device of the camera results in the drawback that the subject of principal interest cannot be reliably photographed with sharp focus.

So, considering what composition has prevailed for the subject of principal photographic interest, it is found that photographers generally favour putting the subject at the center of the area of the picture frame. In fact, 70 to 80% of the snapshots have been taken with the subject at the center of the target area. Therefore, the greater the emphasis laid on the central point of the three target points, the higher the percentage of photographs which will be found acceptable with respect to image sharpness.

In the present invention, therefore, use is made of center-weighting means, whereby distance information for substantially the central point of the three target points is more important than those for the other target points to allow the object at the center of the target area to be taken as the subject of principal photographic interest when focusing.

In the embodiment of FIG. 1, the center-weighting means is constructed in such a form that part of the projection lens 2 which is assigned to the central target point is wider in the cross-sectional area than each of the other two parts which are assigned to the marginal target points. Therefore, the ratio of the amounts of signal light projected through the three optical paths to the target area is proportional to the ratio of area sizes of the three parts of the projection lens 2. When the target area is homogeneous, therefore, the ratio of the amounts of signal light transmitted by reflection back from the target area through the respective optical paths of the collection lens 3 is proportional to the ratio of the area sizes of the three corresponding parts of the projection lens 2. Therefore, the object near or at the central target point gives the light receiving element 4 a greater amount of light reflected therefrom than the amount of light reflected from an object near or at either one of the two marginal target points. Since the light receiving element 4 is formed to the PSD, the values of the central and marginal object distances depending upon the respective positions of incidence are weighted by the values of the light intensity at the corresponding points of incidence and their arithmetical mean is taken as the value of the object distance. It follows that distance information concerning the object at or near the central target point is treated with a greater emphasis than the distance information concerning either of the marginal target points by a magnitude based on the difference between the intensities of light received from the central and marginal paths. As a result, the output of the light receiving element 4 becomes an object distance information suitable for focusing the photographic lens when the object near or at the central target point is of principal interest.

Though the center-weighting means has been described in conjunction with the projection lens 2 formed by increasing the size of the cross-sectional area of the central part from that of the cross-sectional area of each of the side parts, it may be otherwise located in the collection lens 3 by widening the cross-sectional area of the central part more than that of the cross-sectional area of each of the side parts. If both of the projection and collection lenses 2 and 3 are provided with such center-weighting means, the ratio of the total amount of signal light incident on the light receiving element 4 is equal to the production of the area ratio of the projection lens 2 and the area ratio of the collection lens 3.

Figure 2:
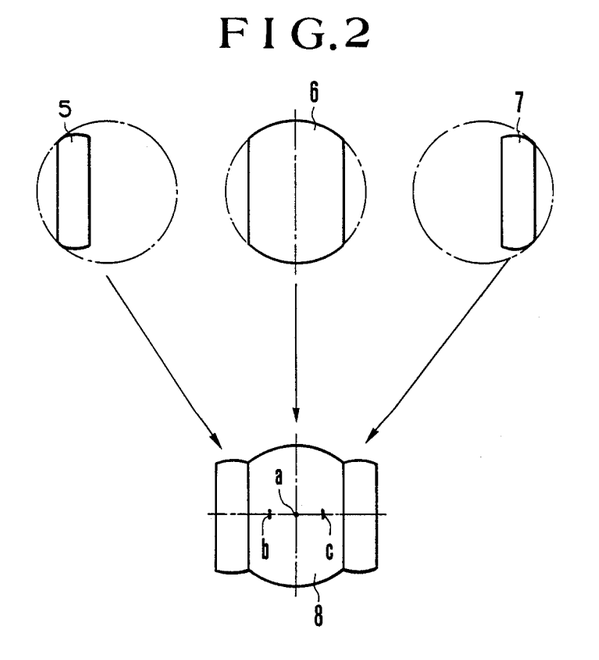
FIG. 2 is a production view of the projection or collection lens of FIG. 1.

In the concrete process for forming the center-weighting projection or collection lens 2 or 3 in the device of FIG. 1, mention may be made of that shown in FIG. 2 where three lens elements 5, 6 and 7 of one and the same performance are cut to respective shapes indicated by solid lines, and then cemented together at their adjoining side surfaces to form a composite lens 8 having three optical axes "a", "b" and "c".

Figure 3:
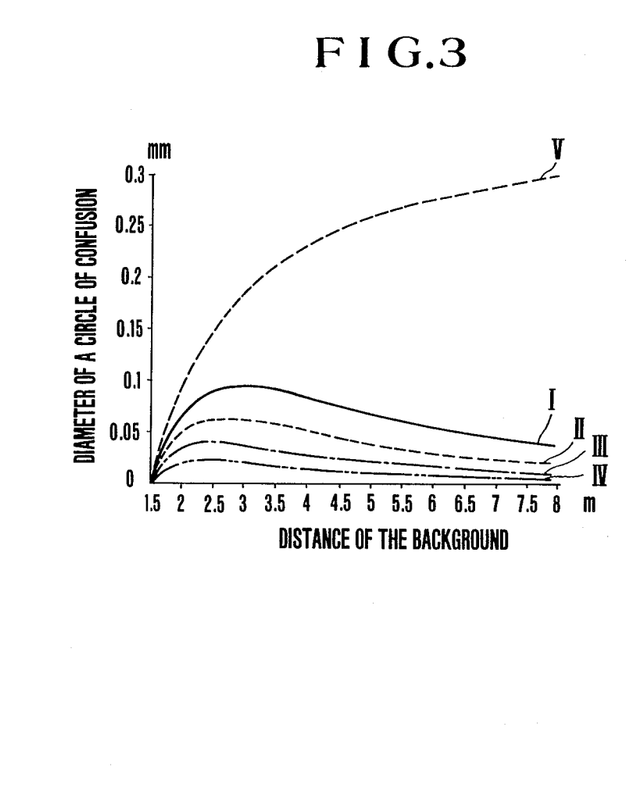
FIG. 3 is a graph of the variation of the image sharpness with the relationship between the object and the background.

Now, determination of the value of the ratio of the size of the cross-sectional area of the central part of the projection or collection lens 2 or 3 to that of the cross-sectional area of each of the other parts will be explained. In FIG. 3, taking the ratio of the amount of light reflected from the object at the center of the target area to the amount of light reflected from the background as a parameter, variation is shown in the degree of sharpness of an object image formed by a photographic lens having a focal length f=38 mm with a full open aperture with a 2.8 F-number as a function of the distance of the background with the object at a distance of 1.5 meters. Note, the above-stated amount of light reflected is inversely proportional to the square of the distance, and is directly proportional to the reflectivity of the object, or background. The degree of image sharpness is expressed in terms of the diameter of a circle of confusion. In FIG. 3, the ordinate is in the diameter of a circle of confusion, and the abscissa is in the distance of the background, with a curve labelled I for the ratio of the amount of light reflected from the object to that of light reflected from the background taken at a value of 1:4 assuming that their distances are the same, another curve labelled II for a ratio of 1:2, another curve III for 1:1, another curve IV for 2:1, and a control curve V which excludes the center-weighting means as in the prior known device.

The 35 mm cameras generally have their allowed diameter of the circle of confusion within limits of 0.03 to 0.35. But, for general photographic conditions, it is allowable to increase the diameter of a circle of confusion up to 0.05 or thereabouts. In addition, by taking into account the difference in reflectivity between the object and the background, it is preferred that on the assumption that the distances of the object and the background are equal to each other and that they have the same reflectivity, the ratio of the amount of light reflected from the object at or near the corresponding point to the center of the area of the picture frame to the amount of light reflected from that part of the background which is equal in size to the object and lies at one of the marginal target points falls in the following range:

| The amount of light reflected from the central target point | ≥ | The sum of the amounts of light reflected from the marginal target points |
|---|---|---|

When the number of marginal target points is two, it is preferred that the amount of light reflected from each marginal target point is equal to less than half the amount of light reflected from the central target point.

On the other hand, in order that the sum of the amounts of light reflected from the marginal points reasonably contributes to measured distance information, a lower limit for that sum is required. This is discussed below.

In a photographic situation where two persons stand side by side, which often failed in the prior known automatic in-focus detecting device, when the central target point is in between the two persons, or the background, the other or marginal target points hit the respective persons. Under this condition, the use of the prior known automatic in-focus detecting device having only one target point at the center of the area of the picture frame resulted in a high percentage of blurred photographs, as suggested by the curve V of FIG. 3. If this can be improved by increasing the number of target points to three, this measure is effective. Even if the diameter of a circle of confusion is decreased from 0.3 to 0.2, unsharpness is unsharpness. In general outdoor photographic situations, the aperture of the photographic lens is usually stopped down to f/5.6 or below. Therefore, the diameter of the circle of confusion becomes halved or less, permitting satisfaction up to the curve I or thereabouts. In other words, it is preferred that the ratio of the amount of light reflected from the central target point to the sum of the amounts of light reflected from the marginal target points fall within the following range:

| The amount of light reflected from the central target point/4 | ≦ | The sum of the amounts of light reflected from the marginal target points |
|---|---|---|

When the number of marginal target points is two, therefore, it follows that the amount of light reflected from each marginal target point is preferably equal to, or larger than, one eighth the amount of light reflected from the central target point.

The foregoing may be summarized as follows: When applied to the generally available 35 mm camera, the ratio of the amount of light reflected from the central target point to the sum of the amounts of light reflected from the marginal target points is preferred to be within the following range:

$$1 \geq \frac{\text{The sum of the amount of light reflected from the marginal target points}}{\text{The amount of light reflected from the central target point}} \geq \tfrac{1}{4}$$

When there are two marginal target points, for the ratio of the amount of light reflected from the central target point to the amount of light reflected from each marginal target point, the following range is preferred:

$$\tfrac{1}{2} \geq \frac{\text{The amount of light reflected from each marginal target point}}{\text{The amount of light reflected from the central target point}} \geq \tfrac{1}{8}$$

And, the above-defined range may be directly applied to the ratio of the size of the cross-sectional area of that part of the projection or collection lens 2 or 3 which is assigned to the central target point to the sum of the sizes of the cross-sectional areas of the other parts which are assigned to the marginal target points. The use of such center-weighting means in the distance measuring device provides the possibility of obtaining measured distance information which is very well suited for auto-focus cameras.

Though, in the above-described embodiment, the area sizes of the corresponding parts of each of the projection and collection lenses 2, 3 to the optical axes thereof are related to the ratio of the reflected light amounts, it is understood that the ratio of reflected light amount can be otherwise established by controlling the transmittance of the aforesaid lens 2, 3 parts, or by using filters or the like of different densities in front of the different parts of the lens 2, 3, or by the combination thereof.

Figure 4:
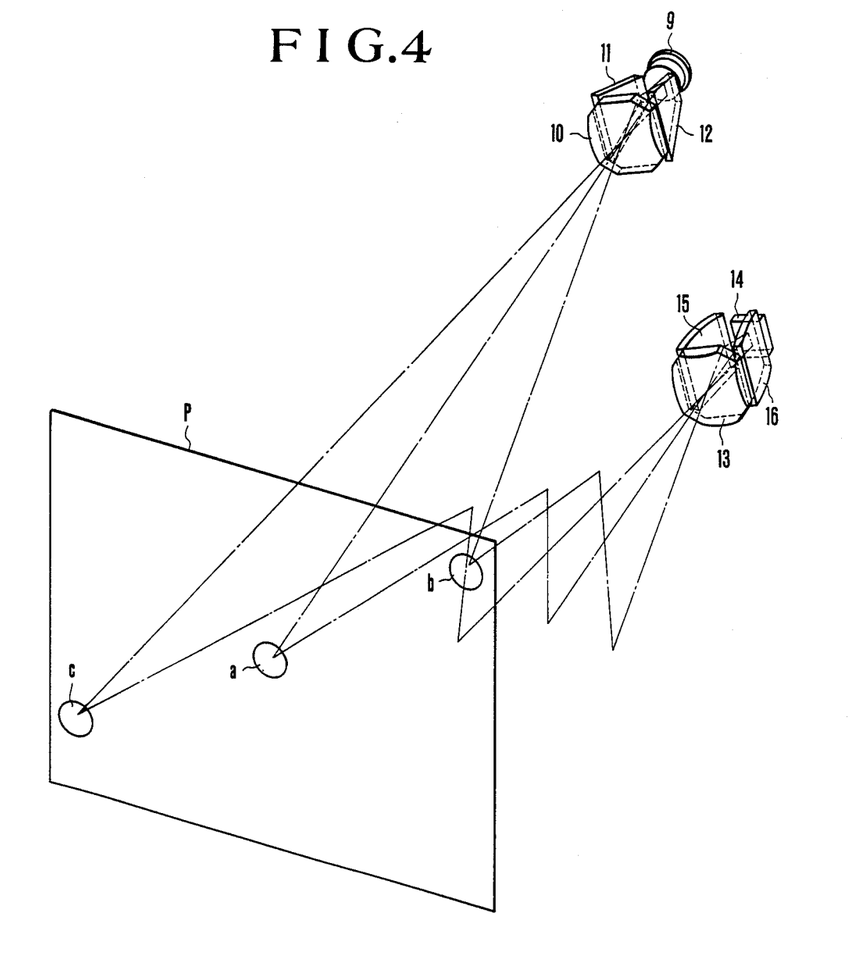
FIG. 4 is a schematic perspective view of another embodiment of the distance measuring device for a camera in accordance with the present invention.

FIG. 4 illustrates another embodiment of the invention which has three optical paths through which the signal light is projected to a target area, and the additional three optical paths through which the signal light is transmitted by reflecting back from the target area are formed by using lenses and mirrors in combination.

An infrared ray emitting diode 9 is similar to that shown in FIG. 1. A projection lens 10 has but one optical axis. Reflection mirrors 11 and 12 reflect respective beams of signal light from the infrared ray emitting diode 9 to the projection lens 10. The reflected two beams are then projected onto an object plane P on which two marginal spot images "b" and "c" are formed, while a central spot image "a" is formed on the object plane P by a beam of signal light projected directly from the infrared ray emitting diode 9 without recourse to the reflection mirrors 11 and 12. A collection lens 13 has but one optical axis like the projection lens 10, and is positioned in axial alignment to a light receiving element 14 similar to that shown in FIG. 1. Light radiating from the spot image "a" on the object plane P is focused by the collection lens 13 directly on the light receiving element 14. Light radiating from the spot image "b" passes through the collection lens 13 to a mirror 15 and is focused on the light receiving element 14. Light radiating from another marginal spot image "c" passes through the collection lens 13 to another mirror 16 and is focused on the light receiving element 14.

The amount of light projected to form each spot image "a", "b", "c" (the rate of contribution to the determination of a distance) can be adjusted by varying the effective diameter of the projection lens 10 and the size of the reflection surface area of the mirror 16. By taking into account the spectrum of light from the infrared ray emitting diode 9 and the reflection factor of the mirror 16, the size of each constituent element must be determined so that the amount of light reflected falls within the above-defined range.

By the way, in order that the influence of the ambient light is reduced as much as possible, attention must be paid to the distribution of the transmission light amount between the light projecting system and the light receiving system.

Reference symbol E identifies constant energy of the light source per unit of solid angle, PC a solid angle of that part of the projection lens 10 which has its optical axis at almost the center of the area of the picture frame, Ps a solid angle of each of the other parts of the projection lens 10 which have respective optical axes at the marginal points, Rc a solid angle of that part of the collection lens 13 which has the optical axis at almost the center of the area of the picture frame, Rs a solid angle of each of the other parts which have the respective optical axes at the marginal points, and N the intensity of the ambient light on the object plane, an equation for an amount Sp of reflected light incident on the light receiving element 14 and an equation for the amount Np of ambient light may be expressed as:

$$Sp = (Pc \cdot Rc + Ps \cdot Rs \cdot 2)E \quad \text{(The reflectivity of the object:} \quad (1)$$

$$Np = (Rc + Rs \cdot 2)N$$

The ratio of the total amount of reflected light to the amount of ambient light is Sp/Np.

An equation for the ratio, X, of the amount of projected light to almost the center of the area of the picture frame to the amount of projected light to the other points may be expressed by $$X = Pc \cdot Rc / (Ps \cdot Rs)$$

It is preferred to choose the ratios of the amount of central light to the amount of marginal light in projection and reception so that the Sp/Np becomes maximum when $X$ is constant. The result is $Pc/Ps = \sqrt{X}$ and $Rc/Rs = \sqrt{X}$. That is, it is preferred that the ratio of the amount of light reflected from a point near or at the center of the area of the picture frame to the amount of light reflected from the other points becomes $\sqrt{X}:1$, and when the brightness on the object plane P is uniform, the ratio of the amount of light which has passed through that part of the collection lens 13 which has the optical axis at almost the center of the area of the picture frame to the amount of light which has passed through the other parts which have the other optical axes becomes $\sqrt{X}:1$.

Note, in the present embodiment, in order to measure the distances of a plurality of points, the projection and collection lenses 2 and 3 each are given a plurality of optical axes, or are combined with mirrors 11, 12. But this may be formed by using a prism. In this case, as the method of choosing the ratio of the amount of reflected light, it can be adjusted by varying the size of the reflection surface area or the reflectance.

A further embodiment of the invention is next described wherein without using an optical system of lenses 10, 13 or mirrors 11, 12, 16, the center-weighting means is formed by a plurality of light source elements for projecting signal lights into a target area.

Figure 5:
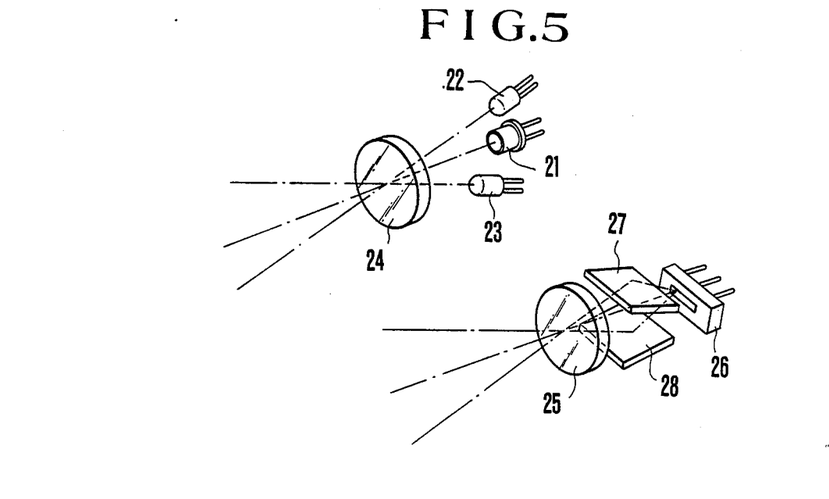
FIG. 5 is a perspective view of the main parts of the distance measuring device for a camera in accordance with the present invention, in another embodiment.

In FIG. 5 there is shown an embodiment of the distance measuring device for a camera with the center-weighting means comprising three light projecting elements 21, 22 and 23 for emitting signal lights for use in measuring object distances. Of these, the central light projecting element 21 is a semiconductor laser or other high performance light emitting element of which the signal light is projected by a lens 24 operating as a light projection optical system to a target area at a corresponding point at the center of the area of the picture frame or thereabouts. The other light projecting elements 22 and 23 are inexpensive infrared ray emitting diodes usable in the remote control of the television set, and are so oriented that their signal light beams are projected through the lens 24 into the target area at respective different points which correspond to opposite marginal points to each other in the picture frame. The thus projected signal light beams to the respective target points are reflected from respective objects to a collection lens 25 which serves as the light receiving optical system. The reflection of the signal light of the light projecting element 21, after passing through the collection lens 25, goes without further treatment to a light receiving element 26, while the reflections of the signal light of the other two light projecting elements 22 and 23 after passing through the collection lens 25 go to respective mirrors 27 and 28 which serve as reflection members and after being once reflected go to the light receiving element 26. The light receiving element 26 is, similar to the embodiment of FIG. 1, in the form of a semiconductor position sensitive device (PSD) for producing an output representing an object distance depending upon the points of incidence of the aforesaid three reflections and their amounts thereon. In more detail, the positions at which the aforesaid reflections are incident on the light receiving element 26 vary as a function of the object distance. The three light projecting elements 21, 22 and 23 are on a common vertical line perpendicular to the base line, and the mirrors 27 and 28 have a common plane normal to their reflection surface in a direction perpendicular to the base line. If all the objects at the respective target points lie at the same distance, the reflections reach the same incident position on the light receiving element 26. Therefore, its output represents just that object distance. If the distances of those three objects are different from one another, the output represents an object distance determined from a weighted mean position of the incident positions of these reflections by their incident amounts.

Figure 6:
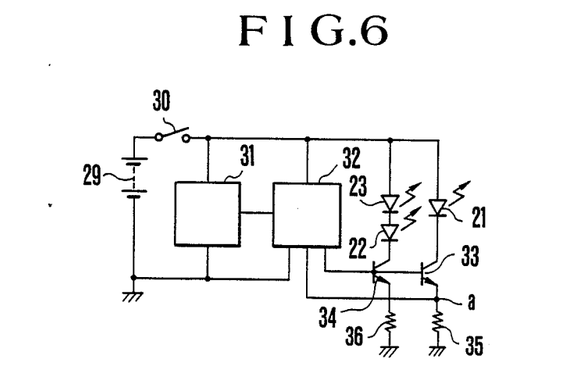
FIG. 6 is an electrical circuit diagram of the device of FIG. 5.

FIG. 6 illustrates a drive circuit for the light projecting elements 21, 22 and 23 of FIG. 5. An electrical power source or battery 29 for example, a lithium battery has recently been increasingly used in cameras, and has a voltage of about 6 volts in an open circuit. A light measurement start switch 30 is adjacent a release member upon closure to supply power from the battery 29 to all the circuit elements. The light projecting elements of FIG. 5 are identified as 21, 22 and 23. The elements 22 and 23 are connected in series to each other and to the battery 29, and in parallel to the element 21. A light measurement control circuit 31 including the light receiving element 26 of FIG. 5 starts to operate when the switch 30 is turned on, and forms object distance information based on the output of the light receiving element 26. The circuit 31 may make use of the information disclosed in Japanese Laid-Open Patent Application No. SHO 57-44809. A light projecting element drive circuit 32, known to those skilled in the art, produces a train of pulses with a prescribed frequency which are applied to the base electrodes of a transistor 33 for the light projecting element 21 and another transistor 34 for the light projecting elements 22 and 23. When the transistors 33 and 34 are in their conducting states, current flows to the light projecting elements 21, 22 and 23, thereby light is given off. As the conducting and non-conducting of the transistors 33 and 34 is recycled, the light projecting elements 21, 22 and 23 emit signal light at the same frequency as that of the drive pulses, the light of which is projected to three points within a target area, as has been mentioned above.

To regulate the current flowing through the light projecting element 21, a resistor 35 is connected to the emitter of the transistor 33, and a voltage appearing at their junction "a" is fed back to the drive circuit 32. This voltage is proportional in magnitude to the intensity of current flowing through the light projecting element 21. To maintain a constant current intensity, therefore, the drive circuit 32 controls the voltage on the transistor 33 to hold the voltage of the junction "a" at a constant level. Because the voltage on the base of the other transistor 34 is equal in magnitude to that on the base of the transistor 33, the intensity of current flowing through the other light projecting elements 22 and 23 is maintained at a constant level. In addition, the ratio of the intensity of current flowing through the elements 22 and 23 to the intensity of current flowing through the element 21 can be varied depending only on the resistance value of a resistor 36 connected to the emitter of the transistor 34. If the resistance value of the resistor 36 is equal to that of the resistor 35, a current of almost equal intensity to that of the current flowing through the light projecting element 21 flows through the other light projecting elements 22 and 23, and if larger, a weaker current flows through the light projecting elements 22 and 23. This is valid only when the transistors 33 and 34 have characteristics identical to each other. It is needless to say that instead of the voltage at the junction "a" it is also possible to use the voltage at the emitter of the transistor 34 when it is fed back to the drive circuit 32, so that a result equivalent to the above will be attained.

It should be pointed out that, to provide for such a circuit with the center-weighting means, it is in the embodiment of the invention that the ratio of the resistance values of the resistors 35 and 36 is determined so that the amount of signal light projected from the element 21 to the central target point is greater than either of the amounts of signal light projected from the elements 22 and 23 to the respective marginal target points. Thereby, the amount of light reflected from the object at the central target point gives essentially the light receiving element 26 a greater amount of incident light than either of the amounts of light reflected from the objects at the marginal target points. Thus, similar to the embodiment of FIG. 1, measured distance information concerning the object near or at the central target point is treated with greater emphasis than measured distance information concerning the objects at the marginal target points.

In determining the resistance ratio of the resistors 35 and 36, the efficiency of light emission of the light projecting elements 21, 22, 23 must be considered. In the embodiment of the invention, however, as has been described above, the light projecting element 21 is of high light emission efficiency, since it is a semiconductor laser emitting element, while the other light projecting elements 22 and 23 are of low light emission efficiency since they are infrared ray emitting diodes or the like. Two resistors of which the resistance values are just or almost equal to each other may, therefore, be used as the resistors 35 and 36. Even if the currents flowing through the light projecting element 21 and through the pair of the light projecting elements 22 and 23 are almost equal in intensity to each other, due to the difference between their light emission efficiencies, the amount of light projected from the light projecting element 21 becomes greater than the sum of the amounts of projected light from the elements 22 and 23. In actual practice, it is desirable that the ratio of the projected light amount of the element 21 to that of the elements 22 and 23, similar to the embodiment of FIG. 1, fall in the following range:

$$\frac{1}{4} \leq \frac{\text{The sum of the reflected light amounts from the marginal target points}}{\text{The amount of reflected light from the central target point}} \leq 1$$

If the number of marginal target points is two, it is desirable to satisfy the following condition:

$$\frac{1}{2} \leq \frac{\text{The reflected light amount from each marginal target point}}{\text{The reflected light amount from the central target point}} \leq 1$$

Under this condition, if the given light emission efficiencies of the light projecting elements 21, 22 and 23 do not suffice for a desired larger amount of projected light from the element 21 than the amount of projected light from the elements 22 and 23, one only needs to decrease the ratio of the resistance value of the resistor 35 to that of the resistor 36. This leads to an increase in the ratio of the current flowing to the light projecting element 21 to that flowing through the light projecting elements 22 and 23 with an increase in the ratio of the projected light amount of the element 21 to that of the elements 22 and 23. Conversely, when making the amount of the projected light of the element 21 less than that of the elements 22 and 23, the ratio of the resistance value of the resistor 35 to that of the resistor 36 is increased with a decrease in the ratio of the current flowing through the element 21 to that flowing through the elements 22 and 23. Note, it goes without saying that even when the light projecting element 21 and the light projecting elements 22, 23 are identical light emitting elements of the same efficiency, it is possible to form a center-weighting means of a performance similar to that described above by decreasing the ratio of the resistance value of the resistor 35 to that of the resistor 36 with an increase in the ratio of the current flowing through the element 21 to that flowing through the elements 22 and 23.

Though the foregoing embodiment has been described in connection with the center-weighting means as provided in the three light projecting elements 21, 22, 23, of which the one for the central target point produces a greater amount of light than that of the others, it is understood that the center-weighting means may be otherwise provided in the light receiving element 26, while the amounts of projected light are equal to each other. In this case, the mirrors 27 and 28 of FIG. 5 must be removed, and, instead two additional light receiving elements (PSD) are used to receive the reflected light from the respective marginal target points. To emphasize the central portion of the area of the picture frame, the sensitivity of the central light receiving element is higher than that of the side ones, or the output of the central one is larger than that of the side ones by using a resistor or the like. Note, in these cases, the outputs of either end of all the light receiving elements are finally added to produce a pair of outputs equivalent to the respective outputs at both of the ends of the light receiving element 26 of FIG. 5 as the measured distance information.

Note, in the embodiment of FIG. 5, the method of varying the amount of projected light is by using the current value. But, for a light projecting element 21, 22, 23 of which the intensity of light emission varies with variation of the voltage, the method is to use a circuit for converting the aforesaid current value to a voltage value. Also, as the means for causing the current value to vary, instead of using the aforesaid resistors 35, 36, use may be made of transistors, operational amplifiers, or the like. Furthermore, instead of the mirrors 26 and 27 of FIG. 5, a complex lens in which three optical axes are oriented to different directions as shown in the embodiment of FIG. 1, a prism assembly, or other suitable optical systems may be used as a matter of course.

The present embodiment, without the necessity of using a lens, mirror, or an optical system, forms the center-weighting means by differentiating the amounts of projected light of a plurality of light projecting elements 21, 22, 23. Compared with the center-weighting means which is formed by using a lens or mirror type optical system, there is no longer any need to use such a large size complex lens as the light projection lens 2 of FIG. 1, facilitating minimization of the size and flexibility of the design. Another advantage is to permit selection of even a semiconductor lasar emitting diode, which is characteristic of a small angle of divergence of light emission, for use as the light projecting means. Still another advantage is that when the light projecting element of high output 21 for the central target point is combined with the light projecting elements 22,23 of low output for the marginal target points, the center-weighting means can be constructed in a very simple form.

Also, in the present embodiment, the light projecting element 21 for projecting a signal light to the central point in the target area or thereabouts and each of the light projecting elements 22,23 for projecting the signal light to the marginal points in the target area are driven in parallel, and the driving state of one of the elements is only fed back so that the driving of all the elements is controlled by its feedback signal. Therefore, one set of control circuits suffices, and it is very easy to adjust the ratio of the projected light amount of the central and side elements 21 and 22,23 to establish the center-weighting means. These constitute features of the invention.

In any of the above-described embodiments, the signal light is projected to a central part of the target area or thereabouts and two marginal portions, in total, three places. But, as long as the prerequisite that the central portion of the target area or the neighbourhood thereof and the other portion or portions be aimed at is satisfied, any number of target points to which the signal light is projected may be provided in the common target area. It is needless to say that the present invention is applicable to any of these cases.

As has been described above, the present invention provides a distance measuring device having a plurality of target points with center-weighting means for laying a heavier emphasis on the measured distance information of the central target point than on the measured distance information of the other target points. A great advantage is that even when a subject of principal photographic interest is out of the central target point, such a measured distance information which focuses the camera on that subject is obtained without performing any pre-focusing operation. When the subject of principal photographic interest lies at the central target point, the measured distance information provides for the subject focus adjustment which would otherwise be inaccurate in the conventional device of this kind and which has an accuracy so great, as the conventional type device which has only one target point.

What is claimed is:

1. A distance measuring device for a camera capable of measuring distances of a plurality of points in a photographic scene area by projecting distance measuring signals to the points and receiving the signals reflected from the points, comprising:

(A) signal emitting means for projecting the distance measuring signals to the plurality of points in the scene area, said signal emitting means emitting a distance measuring signal of greater intensity to a central portion of the scene area than a distance measuring signal emitted by said signal emitting means to a marginal portion of the scene area, and said signal emitting means comprising:
   (A-1) first light emitting means for projecting the distance measuring signal to the central portion of the scene area; and
   (A-2) second light emitting means for projecting the distance measuring signal to the marginal portion of the scene area, the signal emitted from the second light emitting means being weaker than the signal emitted from the first light emitting means; and
(B) signal receiving means for receiving the distance measuring signals reflected by the points in the scene area, said signal receiving means forming a proper distance measuring information based on distance measuring information of the plurality of points in the scene area obtained from the reflected signals, and intensified with respect to the central portion than the marginal portion of the scene area according to the degrees of intensity of the reflected signals, wherein the light emission intensity of the first light emitting means and the light emission intensity of the second light emitting means satisfy the following condition:

$$\frac{\text{the light emission intensity of the second means}}{\text{the light emission intensity of the first means}} \geq \tfrac{1}{4}.$$

2. A device according to claim 1, wherein the first light emitting means has one light emitting portion and the second light emitting means has two light emitting portions, and the light emission intensity of the light emitting portion of the first light emitting means and the light emission intensity of one of the two light emitting portions of the second emitting means satisfy the following condition:

$$\frac{\text{the light emission intensity of one of the two portions of the second means}}{\text{the light emission intensity of the portion of the first means}} \geq \tfrac{1}{8}$$

3. A device according to claim 1, wherein the signal emitting means includes control means for controlling driving of the first light emitting means and the second light emitting means, said control means feeding back information of the drive of either of said first and second light emitting means and controlling the drive of the first and second light emitting means based on the feedback information.

4. A distance measuring device capable of measuring distances of a plurality of points in a scene area by projecting distance measuring signals to the points and receiving the signals reflected from the points, comprising:
   (A) signal emitting means for projecting the distance measuring signals to the plurality of points in the scene area, said signal emitting means emitting a distance measuring signal of greater intensity to a central portion of the scene area than a distance measuring signal emitted by said signal emitting means to a marginal portion of the scene area; and
   (B) signal receiving means for receiving the distance measuring signals reflected by the points in the scene area, said signal receiving means simultaneously receiving said distance measuring signals reflected from each of the points in the scene area and forming a distance measuring information with more stress imposed on the central portion of the scene area than the marginal portion based on an average of sum of intensities of the received distance measuring signals.

5. A device according to claim 4, wherein the signal emitting means comprises:
   (A) first light emitting means for projecting the distance measuring signal to the central portion of the scene area; and
   (B) second light emitting means for projecting the distance measuring signal to the marginal portion of the scene area, the signal emitted from the second light emitting means being weaker than the signal emitted from the first light emitting means.

6. A device according to claim 4, wherein the signal emitting means includes control means for controlling driving of the first light emitting means and the second light emitting means, said control means feeding back information of the drive of either of said first and second light emitting means and controlling the drive of the first and second light emitting means based on the feedback information.

7. A device according to claim 4, wherein the signal emitting means including:
   (A) a first optical system for projecting the distance measuring signal to the central portion of the scene area; and
   (B) a second optical system for projecting the distance measuring signal to the marginal portion of the scene area, the distance measuring signal projected by said second optical system being of weaker intensity than the distance measuring signal projected by the first optical system.

8. A device according to claim 7, wherein the first and second optical systems are composed of signal projection lenses.

9. A device according to claim 8, wherein the signal projection lens composing of the first optical system has a larger aperture size than the signal projection lens composing of the second optical system.

10. A device according to claim 7, wherein the second optical system includes a reflection member.

11. A distance measuring device for a camera capable of measuring the distance of a plurality of points in a photographic scene area by projecting a distance measuring signal to the points and receiving the signal reflected from the points, comprising:
   (A) signal emitting means for projecting the distance measuring signal to the plurality of points in the scene area, said signal emitting means emitting a distance measuring signal of greater intensity to a central portion of the scene area than a distance measuring signal emitted by said signal emitting means to a marginal portion of the scene area, and said signal emitting means including:
      (A-1) a first optical system for projecting the distance measuring signal to the central portion of the scene area; and
      (A-2) a second optical system for projecting the distance measuring signal to the marginal portion of the scene area, the distance measuring signal projected by said second optical system being of weaker intensity than the distance measuring signal projected by the first optical system; and (B) signal receiving means for receiving the distance measuring signals reflected by the points in the scene area, said signal receiving means forming a proper distance measuring information based on distance measuring information of the plurality of points in the scene area obtained from the reflected signals, and intensified with respect to the central portion than the marginal portion of the scene area according to the degrees of intensity of the reflected signals, wherein the first and second optical systems satisfy the following condition:

$$\frac{\text{the intensity of the distance measuring signal projected by the second optical system}}{\text{the intensity of the distance measuring signal projected by the first optical system}} \geq \tfrac{1}{2}.$$

12. A device according to claim 11, wherein the first optical system has one projection portion and the second optical system has two projection portions, and the intensity of the distance measuring signal projected by the projection portion of the first optical system and the intensity of the distance measuring signal projected by one of the two projection portions of the second optical system satisfy the following conditions:

$$\frac{\text{the intensity of the distance signal projected by one of the projection portions of the second optical system}}{\text{the intensity of the distance measuring signal projected by the projection portion of the first optical system}} \geq \tfrac{1}{2}.$$

13. A device according to claim 11, wherein the signal emitting means includes control means for controlling driving of the first light emitting means and the second light emitting means, said control means feeding back information of the drive of either of said first and second light emitting means and controlling the drive of the first and second light emitting means based on the feedback information.

14. A distance measuring device capable of measuring distances of a plurality of points in a scene area by projecting distance measuring signals to the points and receiving the signals reflected from the points, comprising:

(A) signal emitting means for projecting the distance measuring signals to the plurality of points in the scene area; and (B) signal receiving means for receiving the distance measuring signals reflected from the points, said receiving means receiving the signal reflected from a central portion of the scene area with more stress than the signal reflected from a marginal portion of the area, receiving these signals simultaneously, and forming a distance information with more stress imposed on the central portion than the marginal portion based on an average of a sum of intensities of the reflected signals.

15. A device according to claim 14, in which the signal receiving means comprises:

(A) a first optical system for receiving the distance measuring signal from the central portion of the scene area; and (B) a second optical system for receiving the distance measuring signal from the marginal portion of the scene area, said second optical system being designed so as to receive the reflected signal with less intensity than the first optical system.

16. A device according to claim 15, in which the first and second optical systems are respectively composed of a lens for receiving the signal.

17. A device according to claim 15, in which the lens composed of the first optical system has an aperture size larger than that of the lens composed of the second optical system.

18. A distance measuring device capable of measuring distances of a plurality of points in a scene area by projecting distance measuring signals to the points and receiving the signals reflected from the points, comprising:

(A) signal emitting means for projecting the distance measuring signals to the plurality of points in the scene area;

(B) signal receiving means for receiving the reflected signals of the distance measuring signals so as to form a distance information basing upon said reflected signals; and (C) center-weighting means for weighting said distance information in such a manner that a central portion in said scene area is weighted more than a marginal portion of said scene area concerning the formation of said distance information, wherein the following weighting condition is satisfied:

$$\frac{\text{Weighting of the marginal portion of said scene area}}{\text{Weighting of the central portion in said scene area}} \geq \tfrac{1}{2}.$$

19. A device according to claim 18, wherein said signal receiving means includes means of received signal intensity responsive type for forming said distance information with a weight corresponding to the intensity of the received signal of said distance measuring signals, while said center-weighting means includes intensity determining means for determining said weighting by means of the intensity of the distance measuring signal for the central area in said scene area and the intensity of the distance measuring signal for the marginal area of said scene area.

20. A device according to claim 18, wherein said signal emitting means includes light projecting means for projecting signal lights as said distance measuring signals, said signal receiving means includes means for forming said distance information with a weight corresponding to the intensity of the received light of said signal lights, and said center-weighting means includes intensity determining means for determining said weighting by means of the intensity of the signal light for the central area in said scene area and the intensity of the signal light for the marginal area of said scene area.

21. A device according to claim 20, wherein said light projecting means includes first light emitting means for emitting the signal light for the central area in said scene, and second light emitting means for emitting the signal light for the marginal area of said scene area, and said intensity determining means includes means for setting the light emitting intensity of said first light emitting means larger than that of said second light emitting means.

22. A device according to claim 21, wherein said first light emitting means includes a light emitting part, said second light emitting means includes two light emitting parts, and said intensity setting means includes means for setting a relation between a light emitting intensity of the light emitting part of said first light emitting means and that of one of the light emitting parts of said second light emitting means according to the following condition:

$$\frac{\text{Light emitting intensity of one of the light emitting parts of said second light emitting means}}{\text{Light emitting intensity of the light emitting part of said first light emitting means}} \geq 1.$$

23. A device according to claim 20, wherein said light projecting means includes a first optical system for projecting a signal light from the central portion of said scene area and a second optical system for projecting a signal light for the marginal portion of said scene area, and said intensity determining means includes setting means for setting said first and said second optical system so as to make the intensity of the signal light projected by said first optical system larger than that of the signal light projected by said second optical system.

24. A device according to claim 23, wherein said first optical system includes a first lens, said second optical system includes a second lens, and said setting means includes means for setting an aperture ratio of said first lens larger than that of said second lens.

25. A device according to claim 23, wherein said second optical system includes reflecting means.

26. A device according to claim 23, wherein said light receiving means includes a third optical system for receiving the signal light for the central portion in said scene area and a fourth optical system for receiving the signal light for the marginal portion of said scene area, and said intensity determining means includes second setting means for setting said third and said fourth optical systems so as to make the intensity of said signal light received by said third optical system larger than that of said signal light received by said fourth optical system.

27. A device according to claim 26, wherein said third optical system includes a third lens, said fourth optical system includes a fourth lens, and said second setting means includes means for setting an aperture ratio of said third lens larger than that of said fourth lens.

28. A device according to claim 26, wherein said fourth optical system includes reflecting means.

29. A device according to claim 23, wherein said first optical system includes one projecting part, said second optical system includes two projecting parts, and said intensity setting means includes means for setting the projecting part of said optical first system and one of the projecting parts of said second optical system in such a manner that a relation between an intensity of said signal light projected by the projecting part of said first optical system and that of said signal light projected by one of the projecting parts of said second optical system follows the following conditions:

$$\frac{\text{Intensity of the signal light lead by one of the projecting part of said second optical system}}{\text{Intensity of the signal light lead by the projecting part of said first optical system}} \geq 1.$$

30. A device according to claim 20, wherein said light receiving means includes a first optical system for receiving a signal light for the central portion in said scene area, and a second optical system for receiving a signal light for the marginal portion of said scene area, and said intensity determining means includes setting means for setting said first and second optical systems so as to make the intensity of said signal light received by said first optical system larger than that of said signal light received by said third optical system.

31. A device according to claim 30, wherein said first optical system includes a first lens, said second optical system includes a second lens, and said setting means includes means for setting an aperture of said first lens larger than that of said second lens.

32. A device according to claim 30, wherein said second optical system includes reflecting means.

33. A device according to claim 18, wherein said signal receiving means includes means of received signal amount responsive type for forming said distance information with a weight corresponding to the amount of the received signal of said distance measuring signals, while said center-weighting means includes an amount determining means for determining said weighting by means of the amount of the distance measuring signal for the central area in said scene area and the amount of the distance measuring signal for the marginal area of said scene area.

34. A device according to claim 18, wherein said signal emitting means includes light projecting means for projecting signal lights as said distance measuring signals, said signal receiving means includes means for forming said distance information with a weight corresponding to the amount of the received light of said signal lights, and said center-weighting means includes amount determining means for determining said weighting by means of the amount of the signal light for the central area in said scene area and the amount of the signal light for the marginal area of said scene area.

35. A device according to claim 34, wherein said light projecting means includes first light emitting means for emitting the signal light for the central area in said scene, and second light emitting means for emitting the signal light for the marginal area of said scene area, and said amount determining means includes means for setting the light emitting amount of said first light emitting means larger than that of said second light emitting means.

36. A device according to claim 35, wherein said first light emitting means includes a light emitting part, said second light emitting means includes two light emitting parts, and said amount setting means includes means for setting a relation between a light emitting amount of the light emitting part of said first light emitting means and that of one of the light emitting parts of said second light emitting means according to the following condition:

$$\frac{\text{Light emitting amount of one of the light emitting parts of said second light emitting means}}{\text{Light emitting amount of the light emitting part of said first light emitting means}} \geq \tfrac{1}{2}.$$

37. A device according to claim 34, wherein said light projecting means includes a first optical system for projecting a signal light for the central portion of said scene area and a second optical system for projecting a signal light for the marginal portion of said scene area, and said amount determining means includes setting means for setting said first and said second optical system so as to make the amount of the signal light projected by said first optical system larger than that of the signal light projected by said second optical system.

38. A device according to claim 37, wherein said first optical system includes a first lens, said second optical system includes a second lens, and said setting means includes means for setting an aperture ratio of said first lens larger than that of said second lens.

39. A device according to claim 37, wherein said second optical system includes reflecting means.

40. A device according to claim 37, wherein said light receiving means includes a third optical system for receiving the signal light for the central portion in said scene area and a fourth optical system for receiving the signal light for the marginal portion of said scene area, and said amount determining means includes second setting means for setting said third and said fourth optical systems so as to make the amount of said signal light received by said third optical system larger than that of said signal light received by said fourth optical system.

41. A device according to claim 40, wherein said third optical system includes a third lens, said fourth optical system includes a fourth lens, and said second setting means includes means for setting an aperture ratio of said third lens larger than that of said fourth lens.

42. A device according to claim 40, wherein said fourth optical system includes reflecting means.

43. A device according to claim 34, wherein said light receiving means includes a first optical system for receiving a signal light for the central portion in said scene area, and a second optical system for receiving a signal light for the marginal portion of said scene area, and said amount determining means includes setting means for setting said first and second optical systems so as to make the amount of said signal light received by said first optical system larger than that of said signal light received by said second optical system.

44. A device according to claim 43, wherein said first optical system includes a first lens, said second optical system includes a second lens, and said setting means includes means for setting an aperture for said first lens larger than that of said second lens.

45. A device according to claim 43, wherein said second optical system includes reflecting means.

46. A device according to claim 37, wherein said first optical system includes one projecting part, said second optical system includes two projecting parts, and said amount setting means includes means for setting the projecting part of said optical first system and one of the projecting parts of said second optical system in such a manner that a relation between an amount of said signal light projected by the projecting part of said first optical system and that of said signal light projected by one of the projecting parts of said second optical system follows the following conditions:

$$\frac{\text{Amount of the signal light lead by one of the projecting part of said second optical system}}{\text{Amount of the signal light lead by the projecting part of said first optical system}} \geq \tfrac{1}{2}.$$

* * * * *